United States Patent [19]

Bastgen

[11] 4,211,162
[45] Jul. 8, 1980

[54] PROCESS FOR THE BATCH FILTERING OF SUSPENSIONS

[75] Inventor: Wendel Bastgen, Betzdorf, Fed. Rep. of Germany

[73] Assignee: Alb. Klein & Co. GmbH KG, Niederfischbach, Fed. Rep. of Germany

[21] Appl. No.: 902,039

[22] Filed: May 2, 1978

[30] Foreign Application Priority Data

May 5, 1977 [DE] Fed. Rep. of Germany ....... 2720178

[51] Int. Cl.$^2$ .................... B30B 5/06; B30B 15/30
[52] U.S. Cl. ........................... 100/36; 100/37; 100/101; 100/120; 100/207; 210/77
[58] Field of Search .................... 100/118–120, 100/35, 37, 42, 36, 101, 193, 207, 209; 210/386, 400, 77

[56] References Cited

U.S. PATENT DOCUMENTS

| | | | |
|---|---|---|---|
| 3,232,219 | 2/1966 | Gunkel | 100/120 |
| 3,942,433 | 3/1976 | Wohlfarter | 100/118 |
| 4,019,431 | 4/1977 | Bastgen | 100/37 |

FOREIGN PATENT DOCUMENTS

| | | | |
|---|---|---|---|
| 1165986 | 3/1974 | Fed. Rep. of Germany | 100/118 |
| 2306827 | 11/1976 | France | 210/386 |

*Primary Examiner*—Stanley N. Gilreath
*Attorney, Agent, or Firm*—Hane, Roberts, Spiecens & Cohen

[57] ABSTRACT

For the batch filtration of suspensions by application of external pressure, after the pressing of the suspension in the press-chamber space and before entrance of the resultant press cake into at least one subsequent press-chamber space the structure of the press cake is changed by shearing forces and the press cake is curved and at least partially torn apart. In the case of municipal sludge the flaked sludge is subjected in a first pressing zone to slow increase of pressure and a pressure of up to about 1 bar and then is subjected in at least one following press zone to a pressure increase which is more rapid than in the first press zone, up to a pressure of about 3 bars.

14 Claims, 2 Drawing Figures

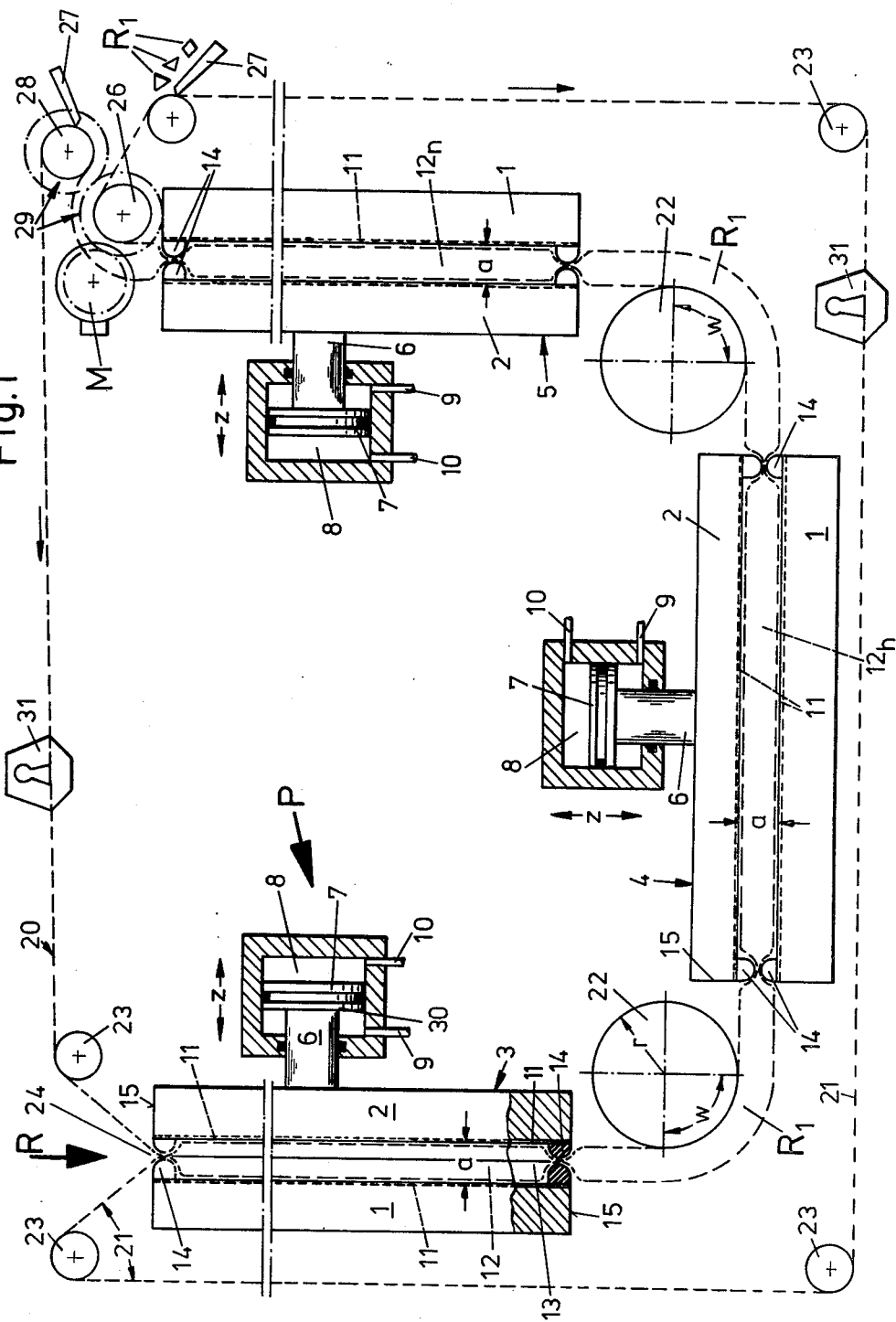

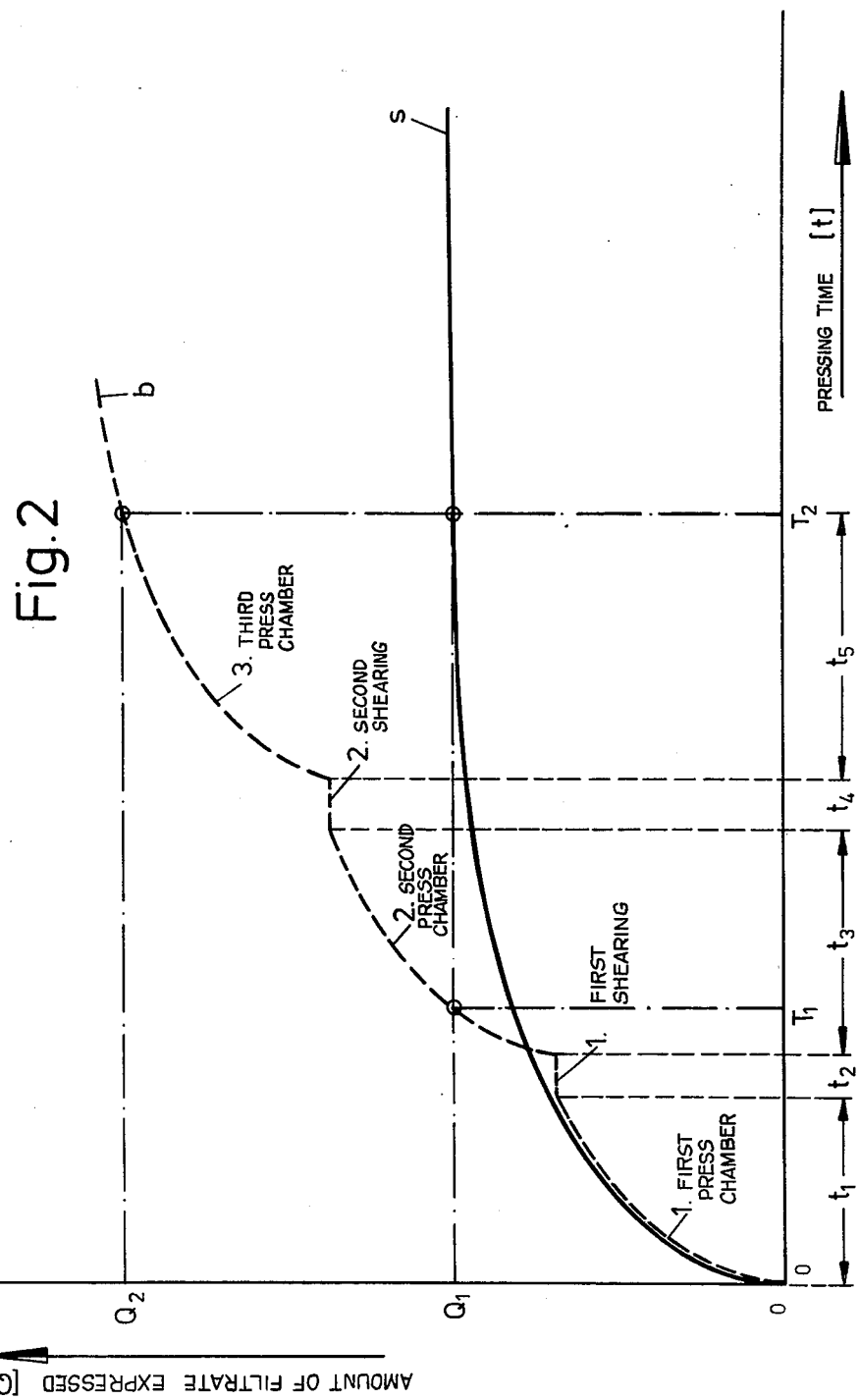

PROCESS FOR THE BATCH FILTERING OF SUSPENSIONS

FIELD OF THE INVENTION

This invention relates to a process for the batch filtering of suspensions by application of pressure within a pressing chamber or the like.

PRIOR ART

Filter presses are known in which the suspension contained between filter cloths is forced out through membranes which are placed under hydraulic or pneumatic pressure from the outside. The volume of suspension introduced into a filter chamber remains there until the end of the filtration process.

For a desired high through-put, it is necessary to connect a large number of such filter chambers in parallel, which means a considerable amount of apparatus and furthermore a high consumption of energy for the increase of the pressure in the large total volume—composed of the sum of the individual volumes—behind the membranes. Control of the rate of filtration is possible only by increasing the pressure, but the structural viscosity and thixotropy of the suspensions from which the water is to be removed permit, with practially all industrially important substances, only a very slow increase in pressure, thus resulting in low capacity.

Similar disadvantages are inherent in a filter press in accordance with U.S. Pat. No. 1,308,943, which has pressure cushions and filter bags arranged alternately one behind the other, the emptying of which is time consuming and difficult. In addition, it has been found that in the case of particularly viscous sludges the use of such filter chambers does not lead to a sufficient degree of removal of water even if the sludge travels through several of such filter chambers one after the other.

SUMMARY OF THE INVENTION

An object of the present invention is to provide an inexpensive simple method of filtration which, while avoiding the above-indicated disadvantages and assuring a large through-put produces a high solids content in the press cake by due consideration of the water-removal properties characteristic of each suspension.

This object is achieved by a process in which, after the pressing of the suspension in the press chamber and before the entry of the resultant pressed cake into at least one subsequent press chamber, the structure of the press cake is changed by shearing forces. The resultant press cake in this connection is advantageously at least partially curved or torn apart between the press chambers.

The suspension to be dewatered is fed in succession through several press chambers connected one behind the other in which filtrate is expressed under static pressure. In accordance with the invention, the suspension to be dewatered is exposed in a first press chamber to a continuous increasing pressing pressure the rate of increase and maximum of which depend on the dewatering properties of the suspension. In addition, the pressure in one press zone can be increased as compared with the pressure in the preceding press zone.

It also lies within the scope of the process of the invention that in order to dewater municipal sludge the sludge be initially pressed in a first press zone with slow increase of pressure and a pressure of up to about 1 bar and then subjected in at least one subsequent press zone to a rapid increase in pressure—as compared with the first press zone—with a pressure of up to about 3 bars. Furthermore, the municipal sludge should advantageously be furthermore exposed in a third process zone with very rapid increase in pressure, to a pressure of up to about 10 bar.

Experience has shown that in this way the output of periodically operating filter presses can be considerably increased, in particular with an apparatus of the aforementioned type in which there are provided at least two press chambers, connected in series as well as at least two moving filter media which are common to them and receive the suspension between themselves—for instance filter cloths—and extend approximately parallel to the press surfaces being conducted over a curved surface between the press chambers.

In accordance with another feature of the apparatus of the invention, the curved surface is formed by the circumferential wall of a guide roller or drum behind which—in accordance with another feature—at least one additional guide drum can be arranged; in the latter event, the filter cloths are applied in approximately meandering fashion in cross section onto said guide rollers so that the pressed cake is first curved in one direction and then in the opposite direction.

In accordance with the invention a stationary press plate on the one hand and a press plate which is variable in spacing with respect to said stationary plate on the other hand serve as press surfaces of the press chamber; the moving press plate can be moved both hydraulically or pneumatically and mechanically. It has been found advantageous to use elastic membranes instead of rigid press plates.

In accordance with another feature of the invention, the filter media or the endless filter cloths are so guided over guide rollers that they form an entrance funnel or entrance trough for the suspension in front of the first press chamber.

A U-shaped arrangement of the individual press chambers with respect to each other has been found to be particularly favorable.

The individual press chambers can, in accordance with the invention, be so closed off laterally by edge beads or similar packing means that the individual press plates can be arranged both horizontally as well as vertically or inclined.

BRIEF DESCRIPTION OF THE DRAWING

Other advantages, features, and details of the invention will be evident from the following description of preferred embodiments read with reference to the drawing, in which:

FIG. 1 shows a pressing device in diagrammatic cross section; and

FIG. 2 is a graph which explains the pressing process.

DETAILED DESCRIPTION

In the embodiment of a pressing apparatus P shown in FIG. 1 three press chambers 3, 4, 5 each formed of a rigid press plate 1 and a movable press plate 2 are so arranged that viewed in cross section they form approximately a U. Each of the movable press plates 2 is connected via a ram 6 with a piston 7 in a cylinder chamber 8 which can be acted on by liquid under pressure via hydraulic conduits 9, 10 so as to move the movable press plate 2 in order to change the press plate spacing a in the direction indicated by the arrow z.

On their facing sides the press plates 1 and 2 are provided with grooves 11. The lateral sealing of the press-chamber space formed by the clearance 12 between the press plates 1, 2 is effected by sealing elements 13 provided at the clearance ends. The seals arranged on the heads 15 of the press plates 1, 2 are in the form of elastic beads 14.

Two filter cloths or perforated belts 20, 21 are conducted through the clearance 12 between the press plates, which filter cloths between every two adjacent press chambers 3, 4 and 4,5 respectively are placed around guide drums 22 of radius r with an angle of wrap w of, for instance, 90°. Rollers 23 are additional guides for the filter cloths.

A suspension R from which the water is to be removed is charged in the region of a feed trough 24 which is formed by the filter cloths 20, 21 and tapers towards to the press plates 1, 2 when the distance a between the press plates 1, 2 is relatively large. The press chamber 3 is then closed by the piston 7 which also produces within the inside 12 of the chamber the pressure necessary for the filtering process. Of course, the closing and pressing pressure can also be produced in some other manner, for instance by elastic or rigid membranes acted on directly by the hydraulic liquid or by compressed air, mechanically actuated toggle levers, etc. It is also left to the particular circumstances whether the sealing-off of each filter chamber 12 is effected by elastic beads pressed into the filter cloths 20, 21, or by folding the filter cloths over at their edges, or in some similar manner.

After the closing of the inside 12 of the press chamber, the suspension R is pressurized by increasing the pressure behind the piston 7, the filtrate being thereby forced out through the filter cloths 1,2 and discharging into the grooves 11 of the press plates 1, 2. The best results are obtained in this connection with a pressure increase which is controlled in such a manner that the press cake $R_1$ produced from the suspension R is always acted on with the maximum pressure which it is still just able to withstand in the dewatered condition in which it is, without being pressed into or through the meshes of the filter cloth.

As soon as the amount of filtrate produced decreases, the pressure filter chamber 12 is opened by applying hydraulic pressure to the side 30 of the piston 7 and thereupon transporting the pressed cake $R_1$ present between the filter cloths 20, 21 out of the press chamber 12 into the following press chamber $12_h$. In this case the filter cloths 20, 21 together with the press cake $R_1$ lying between them travel around the guide cylinder 22 as a result of which, due to the different radii of bend, the filter cloths 20 and 21 undergo parallel displacement relative to each other which produces a shearing force in the press cake $R_1$ present between them; this force results in a change in structure of the press cake $R_1$. The shearing forces can also be obtained by driving the two filter cloths at different speeds. An increase in the relative movement is obtained by a multiple deflection of the filter cloths 20, 21, which has not been shown in the drawing.

In the second press chamber 4 the filtration process described above is repeated, higher press pressures being generally applicable as a result of the preliminary removal of water which has been obtained in the press chamber 4. Due to the structural change as a result of the shearing forces the amount of filtrate again increases rapidly at the start of the second pressing process.

Towards the end of the filtration the press chamber 4 is opened by suitable actuation of the corresponding hydraulic piston 7 and the press cake $R_1$ is transported by means of the filter cloths 20, 21 around the next guide cylinder 22 into the following press chamber 5 where the piston 7 effects the closing of the press chamber 5 and the further filtration.

Although in the embodiment which has been described by way of example, three press chamber spaces 12, $12_h$ and $12_n$ are provided, the apparatus can, in principle, be produced with any desired number of press chambers. After the completion of the filtration in the last press chamber 5, the press cake $R_1$ present between the filter cloths 20 and 21 is conducted over the end guide roller 26 which is at the same time the drive roller for the transport of the filter cloth 21. In this way the press cake $R_1$ is loosened and it is removed by scrapers 27 from the filter cloth 21. The other filter cloth 20 is driven synchronously or with differential speed via a drive roller 28; the two drive rollers 26 and 28 are connected via a pair of gears 29 with a motor M.

The filter cloths 20, 21 return via the guide rollers 23 to the filling trough 21 in synchronism with the filtering processes, the cloths passing in each case through a washing device 31.

Tensioning and straightening devices which may be necessary for the filter cloths 20, 21 have been omitted from the drawing in order not to clutter it; similarly, the frame in which the entire apparatus P is mounted has not been shown.

Of course, embodiments other than that shown in the drawing are possible, for instance a parallel arrangement of the press chambers 12. In this case, the force for the closing and pressing process in all press-chamber spaces 12 could be obtained by a single hydraulic cylinder 8 whose piston 7 is connected with all movable press plates 2 by corresponding spring elements; the pressures required in the individual press chambers 3, 4, 5 can be adjusted individually.

In FIG. 2 the quantity of filtrate Q pressed out is plotted with respect to the pressing time t. The amount of expressed filtrate obtained at any time is represented qualitatively by the curve s with the assumption that at the given time the maximum pressure is applied which the press cake $R_1$ will still withstand at that moment without being pressed through the filter cloth 20, 21 as a result of the structural viscosity. This shape of curve is characteristic of all press filters. It is clear therefrom that a desired high degree of water removal can be obtained only after a long pressing time.

When the water removal process of the invention is used, the pressing process in the first press chamber 3 is interrupted after a period of time $t_1$ as soon as the filtrate curve s begins to flatten out; the resultant press cake $R_1$ is transported from the first press chamber 12 into the following press chamber 4, it being simultaneously loosened during the time $t_2$ by the shearing forces introduced and so changed in its structure that the filtrate obtained in the second press chamber again shows a considerably steeper course of the curve. In the graph of FIG. 2, the time of stay in the second press chamber 4 is designated $t_3$ while that in the third press chamber 5 is designated $t_5$; between the two last-mentioned press chamber spaces $12_h$ and $12_n$ there is contained the time of the second shearing process $t_4$. It can be seen that the second pressing process is also stopped as soon as the filtrate curve b flattens out. The process can be repeated as frequently as desired until the desired degree of water removal has been reached. In this connection it is found that a given amount of filtrate $R_1$ can be pressed out by the process of the invention within a very much shorter period of time $T_1$ than in the normal pressing process, or that for the same total pressing time $T_2$ a considerably larger quantity of filtrate $Q_2$ is produced by the process of the invention.

What is claimed is:

1. A method of discontinuously filtering suspensions, comprising advancing a suspension stepwise along a path of travel through discrete separated first and second pressure chambers, applying external pressure to said suspension to effect filtering of the suspension by compression in said first pressure chamber to form a filter cake, the suspension being stationary in said first pressure chamber during said compression of said suspension, applying shearing forces to the surface of the resulting filter cake to alter its structure in the travel of said filter cake from the first filter chamber to the second filter chamber and applying external pressure to the filter cake to effect filtering of the cake by compression in said second pressure chamber, said filter cake being stationary in said second pressure chamber during said compression of said cake.

2. A method as claimed in claim 1 wherein said suspension is advanced along said path of travel by being transported therealong between spaced filter members.

3. A method as claimed in claim 2 wherein each of said pressure chambers is formed by clamping said filter members together at spaced locations.

4. A method as claimed in claim 2 wherein said shearing forces are produced by advancing said filter members at different speeds between the first and second pressure chambers.

5. A method as claimed in claim 1 comprising bending said filter cake and effecting at least partial tearing thereof during travel of said cake from said first to said second pressure chamber.

6. A method as claimed in claim 5 wherein the filter cake is advanced from the second pressure chamber to a third pressure chamber, said filter cake being bent during travel from the second to the third pressure chamber in a direction different from that in going from the first to the second pressure chamber.

7. A method as claimed in claim 6 wherein the filter cake is bent in opposite directions.

8. A method as claimed in claim 1 wherein the pressure applied to the filter cake is greater in said second chamber than in said first chamber.

9. A method as claimed in claim 1 wherein the suspension is floculated sludge, the floculated sludge being filtered in the first pressure chamber by a pressure increasing to about 1 bar, and in the second pressure chamber by a pressure increasing, at a faster rate than the pressure in said first chamber, to about 3 bars.

10. A method as claimed in claim 9 wherein said sludge is filtered again in a third pressure chamber by the application of a pressure increasing, at a faster rate than the pressure in said second chamber, to about 10 bars.

11. A method as claimed in claim 1 wherein each pressure chamber is formed by opposed plates located at fixed stations along said path of travel and between which the filter members and suspension are advanced, said external pressure being applied to the suspension by relatively moving said plates towards one another.

12. A method as claimed in claim 11 wherein said plates are parallel to one another and are relatively moved perpendicularly to one another.

13. A method as claimed in claim 1 wherein said path of travel is U-shaped.

14. A method as claimed in claim 2 wherein said filter members are endless bands which are transported in parallel relationship along said path of travel.

* * * * *